United States Patent
Choi (10) Patent No.: US 9,143,891 B2
(45) Date of Patent: Sep. 22, 2015

(54) METHOD FOR PROVIDING LOCATION SERVICE FOR ROAMING TERMINAL

(75) Inventor: Jae-Hyuk Choi, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 666 days.

(21) Appl. No.: 12/990,000

(22) PCT Filed: Apr. 28, 2009

(86) PCT No.: PCT/KR2009/002223
§ 371 (c)(1),
(2), (4) Date: Oct. 28, 2010

(87) PCT Pub. No.: WO2009/136702
PCT Pub. Date: Nov. 12, 2009

(65) Prior Publication Data
US 2011/0045827 A1 Feb. 24, 2011

Related U.S. Application Data

(60) Provisional application No. 61/050,607, filed on May 5, 2008.

(30) Foreign Application Priority Data

Oct. 6, 2008 (KR) .................. 10-2008-0097746
Jan. 22, 2009 (KR) .................. 10-2009-0005685
Mar. 24, 2009 (KR) .................. 10-2009-0025120

(51) Int. Cl.
*H04W 4/00* (2009.01)
*H04W 4/02* (2009.01)
*H04W 8/04* (2009.01)

(52) U.S. Cl.
CPC . *H04W 4/02* (2013.01); *H04W 8/04* (2013.01)

(58) Field of Classification Search
CPC ......... H04W 4/00; H04W 4/02; H04W 64/00; H04W 8/02; H04W 8/04; H04W 8/08; H04W 8/12; H04W 60/00
USPC .......... 455/432.1, 432.2, 432.3, 435.1, 435.2, 455/404.1, 404.2, 456.1–456.7; 370/328, 370/331, 332, 310.2, 338
See application file for complete search history.

(56) References Cited

U.S. PATENT DOCUMENTS 7,613,445 B1 * 11/2009 Stanev .................. 455/407
8,280,997 B2 * 10/2012 Choi ....................... 709/223
(Continued)

FOREIGN PATENT DOCUMENTS

WO WO 2006075856 A1 * 7/2006 ............... H04B 7/26

OTHER PUBLICATIONS

OMA-AD-SUPL-V1_0-20070615-A, Open Mobile Alliance, Jun. 15, 2007.*

*Primary Examiner* — Allahyar Kasraian
(74) *Attorney, Agent, or Firm* — Birch, Stewart, Kolasch & Birch, LLP (57) ABSTRACT

A method for providing a location service for a roaming terminal includes: receiving a start message for starting a location service from a terminal in a situation in which a session for the location service is ongoing; transmitting, by the terminal, a roaming location service start message including an indication parameter for requesting information required for an intended location measurement method and the start message to a server of a network the terminal is visiting; receiving a roaming location service start response message including a start response message and the requested information from the server; and transferring the start response message in the received location service start response message to the terminal.

14 Claims, 7 Drawing Sheets

(56) References Cited

U.S. PATENT DOCUMENTS

| | | | |
|---|---|---|---|
| 8,341,253 B2* | 12/2012 | Choi | 709/223 |
| 8,359,381 B2* | 1/2013 | Choi | 709/223 |
| 8,369,868 B2* | 2/2013 | Choi | 455/456.1 |
| 2006/0058042 A1 | 3/2006 | Shim | |
| 2007/0182547 A1* | 8/2007 | Wachter et al. | 340/539.13 |
| 2007/0185985 A1* | 8/2007 | Shim et al. | 709/223 |
| 2007/0238458 A1 | 10/2007 | Shim | |
| 2007/0281670 A1* | 12/2007 | Shim | 455/414.2 |
| 2007/0287411 A1* | 12/2007 | Kim et al. | 455/404.2 |
| 2008/0109650 A1 | 5/2008 | Shim et al. | |
| 2011/0022710 A1* | 1/2011 | Choi | 709/224 |

* cited by examiner

```
<!-- RLP_SSRLIR -->

<!--
RLP V1.1 Document Type Definition
Copyright Open Mobile Alliance Ltd., 2003
        All rights reserved
RLP is an XML language. Typical usage:
    <?xml version="1.0"?>
    <!DOCTYPE rlp_svc_init PUBLIC "-//OMA//DTD {abbrev x.y}//EN"
            "http://www.openmobilealliance.org/DTD/{filename}"
            [<?oma-{ref}-ver supported-versions="{versions}"?>]>
    <rlp_svc_init>
    ...
    </rlp_svc_init>
Terms and conditions of use are available from the
Open Mobile Alliance Ltd. web site at
http://www.openmobilealliance.org/
-->

<!ENTITY      % extension.param      "">

<!ELEMENT     ssrlir              (supl_session_id, supl_message,
                                   area_info? %extension.param;)>
<!ATTLIST     ssrlir ver CDATA           #FIXED "1.1.0">
```

Fig. 7

| Description: | |
|---|---|
| Specifies the area information that will be provided to the SET for the area event triggered SUPL session | |
| Type: | Element |
| Format: | Char String |
| Defined values: | AREA_ID |
| | GEOGRAPHIC_AREA |
| | AREA_ID_AND_GEOGRAPHIC_AREA |
| Default value: | |
| Example: | `<area_info>AREA_ID</area_info>` |
| Note: | |

Fig. 8

```
<!-- RLP_SSRLIR -->

<!--
RLP V1.1 Document Type Definition
Copyright Open Mobile Alliance Ltd., 2003
          All rights reserved
RLP is an XML language. Typical usage:
    <?xml version="1.0"?>
    <!DOCTYPE rlp_svc_init PUBLIC "-//OMA//DTD {abbrev x.y}//EN"
             "http://www.openmobilealliance.org/DTD/{filename}"
             [<?oma-{ref}-ver supported-versions="{versions}"?>]>
    <rlp_svc_init>
       ...
    </rlp_svc_init>
Terms and conditions of use are available from the
Open Mobile Alliance Ltd. web site at
http://www.openmobilealliance.org/
-->

<!ENTITY     % extension.param    "">

<!ELEMENT    ssrlir               (supl_session_id, supl_message,
                                   area_id_request? %extension.param;)>
<!ATTLIST    ssrlir ver CDATA            #FIXED "1.1.0">
```

Fig. 9 area_id_request

| Description: | |
|---|---|
| Specifies the required area information for the area event triggered SUPL session | |
| Type: | Element |
| Format: | Void |
| Defined values: | |
| Default value: | |
| Example: | <area_id_request type="YES" area_info="AREA_ID"> |
| Note: | | type

| Description: | |
|---|---|
| Indicates the H-SLP or the H-SLC requests the area-ids for the area event triggered session to the V-SLP or the V-SLC. | |
| Type: | Attribute |
| Format: | Char String |
| Defined values: | NO |
| | YES |
| Default value: | |
| Example: | <area_id_request type="YES"> |
| Note: | | area_info

| Description: | |
|---|---|
| Specifies the area information that will be provided to the SET for the area event triggered SUPL session | |
| Type: | Attribute |
| Format: | Char String |
| Defined values: | AREA_ID |
| | GEOGRAPHIC_AREA |
| | AREA_ID_AND_GEOGRAPHIC_AREA |
| Default value: | |
| Example: | <area_id_request area_info="AREA_ID"> |
| Note: | |

Fig. 10

```
<!-- RLP_SSRLIR -->
<!--
RLP V1.1 Document Type Definition
Copyright Open Mobile Alliance Ltd., 2003
         All rights reserved
RLP is an XML language. Typical usage:
    <?xml version="1.0"?>
    <!DOCTYPE rlp_svc_init PUBLIC "-//OMA//DTD {abbrev x.y}//EN"
             "http://www.openmobilealliance.org/DTD/{filename}"
             [<?oma-{ref}-ver supported-versions="{versions}"?>]>
    <rlp_svc_init>
       ...
    </rlp_svc_init>
Terms and conditions of use are available from the
Open Mobile Alliance Ltd. web site at
http://www.openmobilealliance.org/
-->

<!ENTITY    % extension.param     "">

<!ELEMENT   ssrlir                (supl_session_id, supl_message,
                                   area_id_request? %extension.param;)>
<!ATTLIST   ssrlir ver CDATA             #FIXED "1.1.0">
```

Fig. 11

Area_Id_request

| Description: | |
|---|---|
| Indicates the H-SLP or the H-SLC requests the area-ids for the area event triggered session to the V-SLP or the V-SLC | |
| Type: | Element |
| Format: | Char String |
| Defined values: | NO |
| | YES |
| Default value: | NO |
| Example: | <Area_Id_Request>YES</Area_Id_Request> |
| Note: | |

# METHOD FOR PROVIDING LOCATION SERVICE FOR ROAMING TERMINAL

CROSS-REFERENCE TO RELATED APPLICATIONS

This application is the National Phase of PCT International Application No. PCT/KR2009/002223, filed on Apr. 28, 2009, which claims priority under 35 U.S.C. §119(e) to U.S. Provisional Application No. 61/050,607, filed on May 5, 2008 and under 35 U.S.C. §119(a) to Patent Application No. 10-2009-0025120, filed in Korea on Mar. 24, 2009, Patent Application No. 10-2009-0005685, filed in Korea on Jan. 22, 2009, and Patent Application No. 10-2008-0097746, filed in Korea on Oct. 6, 2008, all of which are hereby expressly incorporated by reference into the present application.

TECHNICAL FIELD

The present invention relates to a location information service and, more particularly, to a location service based on a secure user plane location (SUPL).

BACKGROUND ART

In general, a mobile communication system has a function part for calculating the location of a terminal in a mobile communication network to provide a location service that transfers the location of the terminal to a certain entity in a periodic manner or according to a corresponding request.

A network structure related to the location service differs depending on an internal network structure, such as a 3GPP network, a 3GPP2 network, etc. Currently, there are several methods for calculating the location of the terminal, including a cell-ID method for transferring an ID of a cell to which a mobile terminal belongs, a method for calculating the location of a terminal through triangulation by measuring time taken for radio signals to reach each base station from the terminal, and a method of using a GPS (Global Positioning System).

In order to provide the location service to a user, a large quantity (amount) of signals and location information need to be transferred between the mobile terminal and a location server.

Recently, positioning technologies standardized for providing the location service (namely, location services provided based on the location of a mobile terminal) are increasingly used.

These technologies can be provided generally through a user plane for transmitting user data and a control plane for transmitting control data, one of which is a secure user plane location (SUPL) technique that provides the location service through the user plane.

A SUPL-based network includes a SUPL agent, a SUPL location platform (SLP), a SUPL enabled terminal (SET), and the like.

The SUPL agent is a logical service access point that requests location information of a target SET from the SLP, receives measured location information of the target SET from the SLP, and uses it. The SLP is an entity that accesses network resources to obtain location information of the target SET according to a request from the SUPL agent, and performs roaming and resources management, and the like. The SET performs procedures defined at the SUPL along with the SLP through a user plane bearer.

There are two types of location services based on the SUPL: The first service refers to a periodic triggered service that provides the location of the target SET (i.e., terminal) according to a pre-set period; the second refers to an area event triggered service that provides the location of the target set (i.e., terminal) when pre-set conditions in relation to a particular area are met.

The area event triggered service will now be described in detail with reference to FIGS. 1 to 3.

Figure 1:
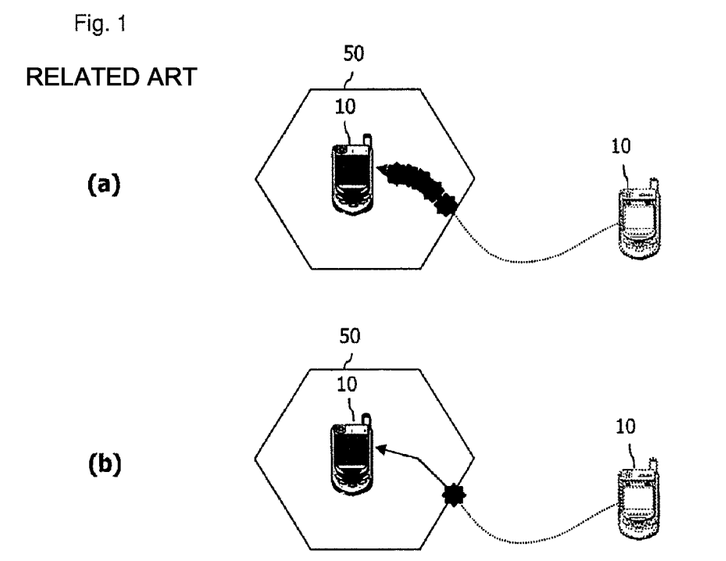
FIG. 1 illustrates a concept of an area event triggered service according to the related art.

FIG. 1 illustrates the concept of an area event triggered service according to the related art.

As shown in FIG. 1, there are four types of area event triggered services. In FIG. 1, the points at which location measurement is made are indicated as asterisks.

As shown in FIG. 1(a), a first area event triggered service is a location service for continuously monitoring to locate the terminal 10 in a previously designated geographic area 50, which is also called an inside location service. A second area event triggered service as shown in FIG. 1(b) refers to a location service that monitors whether or not the terminal 10 enters the previously designated geographic area 50, which is also called an entering location service.

Figure 2:
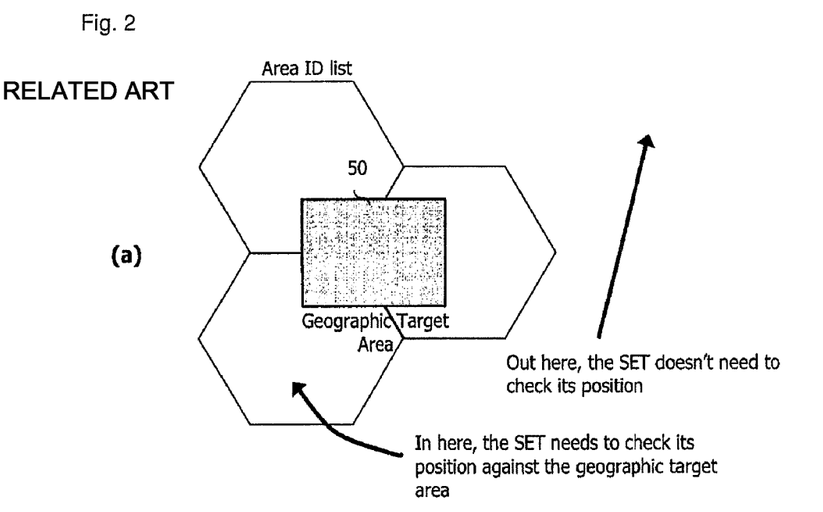
FIG. 2 illustrates an implementation of the area triggered service of FIG. 1.

FIG. 2 illustrates implementation of the area event triggered service as shown in FIG. 1.

As shown in FIG. 2, the previously designated geographic area 50 may have a rectangular shape, a circular shape, or a polygonal shape. Thus, the geographical area should be implemented as coordinate values. However, it causes a significant amount of load to a system when the terminal 10 is monitored as to where it is.

Thus, an Area-id has been proposed to implement the location service (inside service) as to where the terminal is located within the previously designated geographic area 50 or the location server (entering service) as to whether or not the terminal 10 enters the previously designated geographic area 50.

The area-id parameter is a list of IDs of cells. In case of the inside service and the entering service as shown in FIG. 2, the Area-id parameter includes a set of IDs of cells fully included in the previously designated geographic area 50. In case of the inside service, when the area-id parameter is provided, the terminal 10 compares a cell-id of a cell in which the terminal 10 is currently located with a cell-id in the Area-id parameter, and if the both cell-ids are consistent, the terminal 10 performs precise positioning (i.e., precise location measurement) (A-GPS) to monitor where the terminal 10 is located in the previously designated geographic area 50. In case of the entering service, when the Area-id parameter is provided, the terminal 10 compares a cell-id of a cell in which the terminal 10 is currently located with a cell-id of the Area-id parameter, and if the both cell-ids are consistent, the terminal performs positioning to monitor whether the terminal 10 has entered the previously designated area 50.

Figure 3:
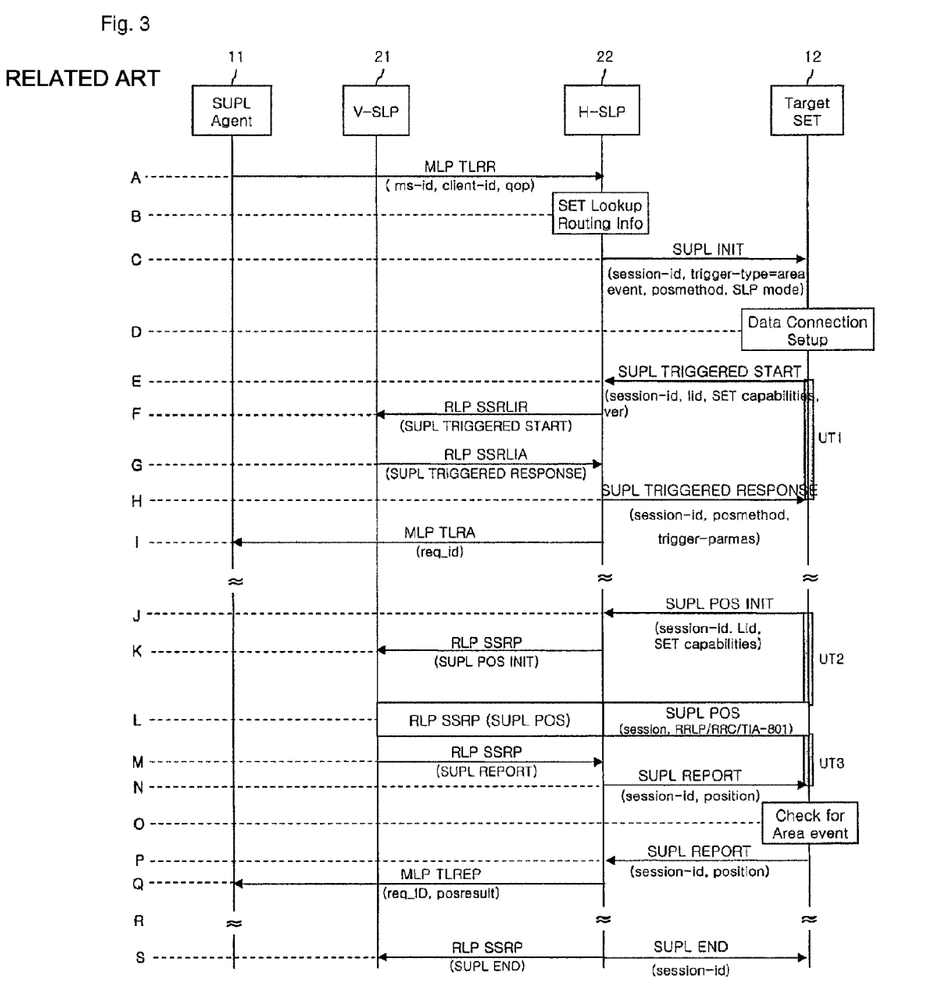
FIG. 3 illustrates one example of a signal flow chart of the area event triggered service according to the related art.

The area triggered service is implemented in the related art through signal flow as shown in FIG. 3.

FIG. 3 illustrates a signal flow of an area event triggered service according to the related art.

As shown in FIG. 3, the related art area event trigger service is implemented by a SUPL-based network. The SUPL-based network includes a SUPL agent 11, a V-SLP (Visiting-SUPL Location Platform), an H-SLP (Home SUPL Location Platform), an SET (SUPL Enabled Terminal) and the like. FIG. 3 shows the case where the target SET 12 has roamed to a visiting network, and in order to perform location measurement in the visiting network, the V-SLP as well as the H-SLP is illustrated.

The signal flow illustrated in FIG. 3 shows location measurement by the V-SLP 21. The signal flow will now be described.

A) In order to request the area triggered location service to check where the target SET 12 is located in the previously designated geographic area, the SUPL agent 11 transmits a location service request message, e.g., an MLP (Mobile Location Protocol) TLRR (Triggered Location Reporting Request) message, to an H-SLP (Home-SUPL Location Platform) 22. The H-SLP 22 refers to an SLP of a home network to which the target SET 12 has registered. The location service request message includes an ms-id, a client-id, and a qop. The ms-id is an ID of the target SET 12, the client-id is an ID of the SUPL agent 11, and qop, an acronym of Quality of Position, indicates accuracy (time delay, spatial precision) in location measurement.

When the H-SLP 22 receives the location service request message, it authenticates the SUPL agent 11 and checks whether the SUPL agent 11 has an authority for the service requested by the SUPL agent 11 via the client-id in the location service request message. Also, the H-SLP 22 checks whether to apply a subscriber privacy to the SUPL agent 11 based on the ms-id in the location service request message.

B) The H-SLP 22 checks whether the target SET 12 is currently in SUPL roaming, and also checks whether the target SET 12 supports the SUPL.

C) Subsequently, in order to start the area event triggered service, the H-SLP 22 transmits a session initiation message, i.e., a SUPL INIT message, to the target SET 12. The session initiation message includes a session-id parameter, a trigger_type parameter indicating a type of a location service, a posmethod parameter indicating an intended (desired) location measurement method, an SLP mode parameter indicating a proxy/non-proxy mode. Meanwhile, if it is required to notify about the target SET 12 according to the result of checking whether to apply the privacy in step A), the H-SLP 22 may include a notification element in the session initiation message. In addition, before transmitting the session initiation message, the H-SLP 22 may calculate hash of the session initiation message to verify validity, and store the calculated hash.

D) The target SET 12 analyzes the received session initiation message, namely, the SUPL INIT message, and performs a required procedure for establishing a stable connection. In this case, if the SUPL agent 11 does not have authority, the target SET 100 may not perform any operation.

The target SET 12 checks whether the session initiation message includes a notification element. If the session initiation message includes a notification element, the target SET 12 checks a rule according to the notification element, and performs a corresponding operation. Also, the target SET 12 checks whether to use the proxy/non-proxy mode according to the SLP mode parameter included in the session initiation message. If the proxy mode is used, the target SET 12 establishes a stable connection to the H-SLP 22 by using an address of the H-SLP 22 provided from the home network.

E) In order to start the requested area event triggered service, the target SET 12 transmits a start message, e.g., a SUPL TRIGGERED START message, to the H-SLP 22. In this case, although a location measurement method designated in the posmethod parameter included in the received session initiation message, i.e., the SUPL INIT message, is not supported by the target SET 12, the target SET 12 transmits the start message. The start message includes a session-id parameter, a location ID indicating an ID of the cell in which the target SET 12 is located, and a SET capabilities parameter indicating capability information of the target SET 12. In addition, the start message includes hash of the received session initiation message. The SET capabilities parameter includes information about a supported location measurement method (e.g., SET-Assisted A-GPS or SET-Based A-GPS) and a location measurement protocol (e.g., RRLP, RRC, TIA-801) related to the supported location measurement method.

F) When the start message, i.e., the SUPL TRIGGERED START message, is received, in order to inform the V-SLP 21 that the target SET 12 is going to start SUPL location measurement, the H-SLP 22 transmits a roaming location service start message including the start message, i.e., the SUPL TRIGGERED START message, for example, an RLP SSLIR (RLP Standard SUPL Roaming Location Immediate Request) message to the V-SLP 21.

In this case, the roaming location service start message, e.g., the RLP SSLIR, includes information about a geographic area previously designated by the SUPL agent 11.

G) The V-SLP 21 determines an intended position measurement method to be used for the area event triggered session, includes a start response message, namely, a SUPL TRIGGERED RESPONSE message, in a roaming location service start response message, e.g., an RLP SSRLIA (RLP Standard SUPL Roaming Location Immediate Answer) message, and transmits the roaming location service start response message to the H-SLP 22.

In this case, the start response message includes a session-id parameter and a posmethod parameter. The start response message includes information about the geographical area previously designated by the SUPL agent 11. Also, the start response message may include an area-id, an ID of cells with respect to the previously designated geographical area.

H) The H-SLP 22 forwards the received start response message to the target SET 12.

I) Subsequently, in response to the location service request message from the SUPL agent 11, the H-SLP 22 transmits a response message, e.g., an MLP (Mobile Location Protocol) TLRA (Triggered Location Reporting Answer) message. The response message, i.e., the MLP TLRA message, includes a req-id parameter indicating a request ID.

Through such procedure, requesting of the area triggered location service with respect to the target SET 12 is performed. A follow-up location measurement procedure will now be described.

J) If the Area-ids are included in the start response message received in step H), the target SET 12 compares an area-id of the area in which the target SET 12 is currently located, and the received area-id. If it is determined that positioning should be performed according to the comparison result, the target SET 12 attempts a connection to a packet data network.

Subsequently, in order to start a session for position measurement with the V-SLP 21, the target SET 12 transmits a location session initiation message, e.g., SUPL POS INIT message, to the H-SLP 22. In this case, the location session initial message may include at least a session-id parameter, a location ID (lid) parameter indicating an ID of a cell to which the target SET 12 belongs, and a SET capabilities parameter. In this case, the target SET 12 provides its location if possible.

K) The H-SLP 22 includes the location session initiation message, e.g., the SUPL POS INIT message, in a roaming location message, e.g., an RLP SSRP (RLP Standard SUPL Roaming Position) message, and transmits the roaming location message to the V-SLP 21.

L) The target SET 12 and the V-SLP 21 exchange a plurality of positioning messages (i.e., location measurement messages) via the H-SLP 22.

M) When the positioning is completed, the V-SLP 21 includes a report message, e.g., a SUPL REPORT message, in a roaming location message, e.g., an RLP SSRP message, and transmits the roaming location message to the H-SLP 22. If the positioning has been performed by the V-SLP 21, the report message, i.e., the SUPL REPORT message, includes the measured location.

N) The H-SLP 22 forwards the received report message, i.e., the SUPL REPORT message, to the target SET 12. The target SET 12 may release the stable connection with the H-SLP 22. The report message includes the positioning value (i.e., location measurement value).

O) In order to check whether or not the area triggered condition is met, the target SET 12 compares the positioning value with the event area.

P) The target SET 12 transmits the SUPL REPORT message including the session-id and the positioning value to the H-SLP 22.

Q) The H-SLP 22 includes the positioning value in an MLP TLREP message, and transmits the same to the SUPL agent 11.

R) If the SUPL agent 11 has requested a report message several times, the target SET 12 waits until another report message is additionally received.

S) When a final report message is received, the H-SLP 22 transmits an end message, e.g., a SUPL END message, to the target SET 12 and transmits a roaming location message including the end message, e.g., an RLP SSRP message, to the V-SLP 21, in order to terminate the area event triggered session.

Figure 4:
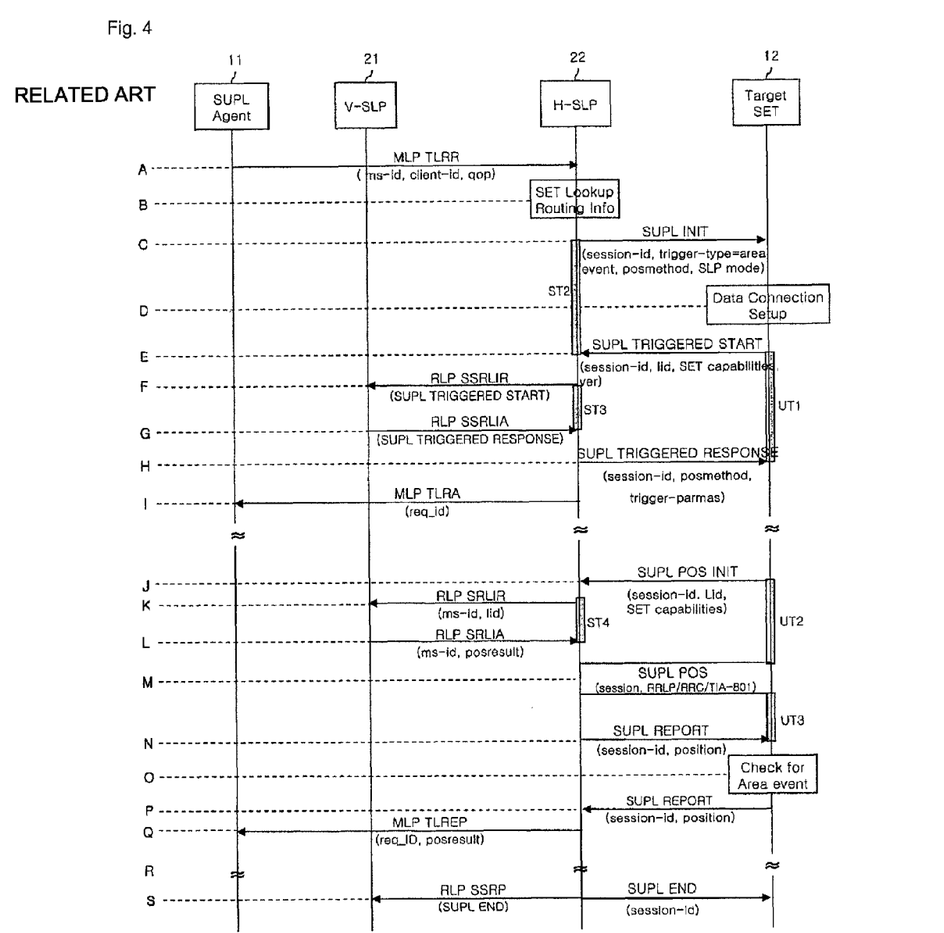
FIG. 4 illustrates another example of a signal flow chart of the area event triggered service according to the related art.

FIG. 4 illustrates another example of a signal flow of the area event triggered service according to the related art. FIG. 4 shows the case where the target SET 12 has roamed to the visiting network, and in order to perform location measurement in the visiting network, the V-SLP as well as the H-SLP is illustrated.

The signal flow illustrated in FIG. 4 shows location measurement by the H-SLP 22. The signal flow will now be described.

A) to I) steps are the same as those illustrated in FIG. 3, so the content of FIG. 3 will be quoted as it is.

J) If the area-id parameters are included in the start response message received in step H), the target SET 12 compares the area id of the area in which the target SET 12 is currently located, and the received area id. If it is determined that location measurement should be performed according to the comparison result but the target SET 12 has not established a data connection yet, the target SET 12 attempts a connection to the packet data network.

Subsequently, in order to start a session for location measurement with the V-SLP 21, the target SET 12 transmits a location session initiation message, e.g., SUPL POS INIT message, to the H-SLP 22. In this case, the location session initial message may include at least a session-id parameter, a location ID (lid) parameter indicating an ID of a cell to which the target SET 12 belongs, and a SET capabilities parameter. In this case, the target SET 12 provides its location if possible.

K) In order to obtain the location based on the Location ID (lid) received in step J), the H-SLP 22 transmits the RLP SRLIR message to the V-SLP 21.

L) The V-SLP 21 converts the Location ID (lid) into a location measurement value, includes the corresponding result in an RLP SRLIA messages, and transmits the RLP SRLIA message to the H-SLP 22.

M) The target SET 12 and the H-SLP 22 exchange a plurality of positioning messages, N) When the precise positioning is completed, the H-SLP 22 transmits a report message to the target SET 12. If the precise positioning has been performed by the H-SLP 22, the report message includes the precise positioning value (i.e., precise position measurement value).

N) The H-SLP 22 forwards the received report message, i.e., the SUPL REPORT message, to the target SET 12. The target SET 12 may release the stable connection with the H-SLP 22. The report message includes the precise positioning value (i.e., precise location measurement value).

O) In order to check whether or not the area triggered condition is met, the target SET 12 compares the precise positioning value with the event area.

P) The target SET 12 transmits the SUPL REPORT message including the session-id and the precise positioning value to the H-SLP 22.

Q) The H-SLP 22 includes the precise positioning value in the MLP TLREP message, and transmits the same to the SUPL agent 11.

R) If the SUPL agent 11 has requested a report message several times, the target SET 12 waits until another report message is additionally received.

S) When a final report message is received, the H-SLP 22 transmits the end message, e.g., the SUPL END message, to the target SET 12 and transmits a roaming location message including the end message, e.g., the RLP SSRP message, to the V-SLP 21, in order to terminate the area event triggered session.

In the related art as described above, if the target SET is located in the home network without roaming, namely, in a non-roaming case, unlike the cases illustrated in FIGS. 3 and 4, the V-SLP 21 is not required and the H-SLP 22 generates the SUPL TRIGGERED RESPONSE message and transmits it to the target SET 12. That is, in case of the non-roaming case, unlike the cases of FIGS. 3 and 4, the H-SLP 22 can directly generate the SUPL TRIGGERED RESPONSE message. In this case, the H-SLP 22 may properly select one of a GEOGRAPHIC_AREA parameter and the Area-id parameter, namely, the ID of the cells of the previously designated geographic area, and include the same in the SUPL TRIGGERED RESPONSE message, such that an application identified by a Client-ID in the MLP TLRR message from the SUPL agent 11.

Meanwhile, if the target SET is roamed to the visiting network as shown in FIGS. 3 and 4, the V-SLP 21 generates the SUPL TRIGGERED RESPONSE message and the H-SLP 22 merely transfers the SUPL TRIGGERED RESPONSE message which has been generated by the V-SLP 21 to the target SET 12. Thus, the H-SLP 22 cannot select one of the GEOGRAPHIC_AREA parameter and the Area-id parameter, namely, the ID of the cells of the previously designated geographic area, and include the same in the SUPL TRIGGERED RESPONSE message, such that an application identified by a Client-ID in the MLP TLRR message from the SUPL agent 11.

Namely, the inventor of the present invention recognizes that, although the location measurement method intended by the H-SLP 22 or the location measurement method requested by the application of the SUPL agent 11 is possibly based on the geographic area or the Area-ID, the ID of the cells, the V-SLP 21 transmits both the GEOGRAPHIC_AREA parameter indicating information about the geographic area and the Area-id parameter, the ID of cells with respect to the previously designated geographic area, to the H-SLP 22, so network resources are not necessary.

For example, although a particular application identified by a Client-ID in the MLP TLRR message from the SUPL agent 11 requests the geographic area-based location measurement method and a different application requests the Area-ID-based location measurement method, because there is not procedure for the H-SLP to inform the V-SLP about the requested location measurement methods, the V-SLP have no choice but to simply include both the GEOGRAPHI-C_AREA parameter and the Area-id parameter, namely, the ID of the cells of the previously designated geographic area, in the SUPL TRIGGERED RESPONSE message.

When the SUPL TRIGGER RESPONSE message includes both the GEOGRAPHIC_AREA parameter and the Area-id PARAMETER, the target SET 12 should measure the location by combining the both parameters.

Namely, the SUPL TRIGGERED RESPONSE message does not provide information about whether the target SET 12 can select one of the two parameters, so the target SET 12 measures the location by combining the both parameters.

Although the particular application identified by the Client-ID of the MLP TLRR message from the SUPL agent 11 requests an Area-id-based position measurement, because the target SET 12 receives both the Graphic Target Area and the Area Id through the TRIGGERED RESPONSE message, the target SET 11 should perform location measurement through a combining method of the Geographic Target Area and the Area Id.

However, unlike the area event triggered method combining the Geographic Target Area and the Area Id as shown in FIG. 3, in the area event triggered method using only one Area id, the location measurement may be performed based on the Area-ID without the necessity of performing precise positioning of step L as shown in FIG. 3. However, the precise positioning in step L is performed and its results are transmitted and received. That is, the unnecessary procedure is performed.

Thus, the target SET 12 unnecessarily consumes battery power for the unnecessary precise positioning.

DISCLOSURE OF INVENTION

Technical Solution

Therefore, in order to address the above matters, the various features described herein have been conceived. One aspect of the exemplary embodiments is to provide a method for providing a location service for a roaming terminal.

This specification provides a method for providing a location service for a roaming terminal, including: receiving a start message for starting a location service from a terminal in a situation in which a session for the location service is ongoing; transmitting, by the terminal, a roaming location service start message including an indication parameter for requesting information required for an intended location measurement method and the start message to a server of a network the terminal is visiting; receiving a roaming location service start response message including a start response message and the requested information from the server; and transferring the start response message in the received location service start response message to the terminal.

In the present invention, the H-SLP can selectively receive information according to its intended location measurement method, so a waste of network resources can be prevented.

In addition, because only the location measurement method intended by the target SET and the H-SLP is performed, performing of location measurement based on both the Area-ID and the geographical area as in the related art can be prevented.

Also, because the target SET does not perform location measurement according to the combining method, a waste of battery power can be prevented.

The foregoing and other objects, features, aspects and advantages of the present invention will become more apparent from the following detailed description of the present invention when taken in conjunction with the accompanying drawings.

MODE FOR THE INVENTION

The present invention is applied to a secure user plane location (SUPL). However, the present invention is not limited thereto and can be applied for any location measurement method to which the technical idea of the present invention is applicable.

The present invention may be embodied in many different forms and may have various embodiments, of which particular ones will be illustrated in drawings and will be described in detail.

However, it should be understood that the following exemplifying description of the invention is not meant to restrict the invention to specific forms of the present invention but rather the present invention is meant to cover all modifications, similarities and alternatives which are included in the spirit and scope of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. The term "and/or" encompasses both combinations of the plurality of related items disclosed and any item from among the plurality of related items disclosed.

It will be understood that when an element is referred to as being "connected with" another element, it can be directly connected with the other element or intervening elements may also be present. In contrast, when an element is referred to as being "directly connected with" another element, there are no intervening elements present.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art.

The accompanying drawings illustrate a SUPL enabled terminal (SET), and the SET may be one of a user equipment (UE) of a UMTS, a mobile station (MS) of a GSM, a laptop computer including an SET function, or a personal digital assistant (PDA). The SET may be various mobile terminals accessed via a wireless local area network (WLAN).

The terms used in the present invention will be briefed as follows.

Geographic area is an area on a map that may have a rectangular, circular or polygonal shape. The geographic area may be represented by coordinate values.

Area-id is a list of IDs of cells including a previously designated geographic area.

SUPL message is a message based on a SUPL protocol and used for exchanging signals between an H-SLP and a SET.

RLP (Roaming Location Protocol) is a protocol used between a V-SLP and the H-SLP.

Figure 5:
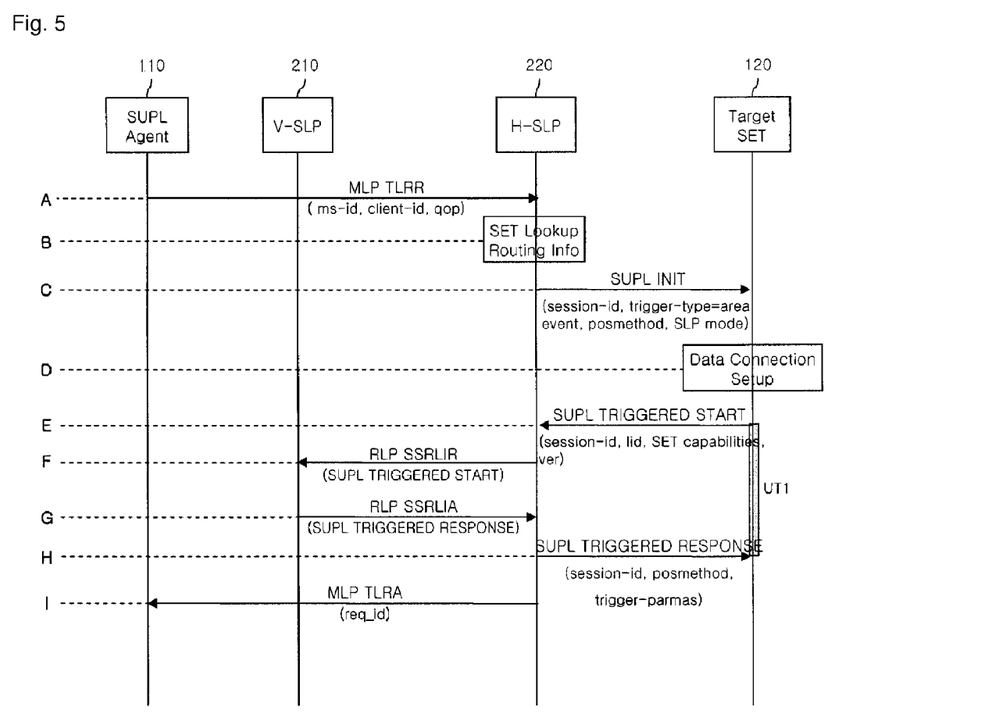
FIG. 5 illustrates a signal flow chart of an area event triggered service according to an embodiment of the present invention.

FIG. 5 illustrates a signal flow chart of an area event triggered service according to an embodiment of the present invention.

As shown in FIG. 5, an area event triggered service according to the present invention is implemented by a SUPL-based network. The SUPL-based network includes a SUPL agent 110, a V-SLP (Visiting-SUPL Location Platform) 210, an H-SLP (Home SUPL Location Platform) 220, an SET (SUPL Enabled Terminal) 120, and the like.

A) to E) steps are the same as those of FIG. 3, so content of FIG. 3 will be quoted as it is.

F) When the H-SLP 220 receives the start message, i.e., the SUPL TRIGGERED START message, it transmits a roaming location service start message, e.g., an RLP SSLIR (RLP Standard SUPL Roaming Location Immediate Request) message, including the start message, i.e., the SUPL TRIGGERED START message, to the V-SLP 210 to inform the V-SLP 210 that the target SET 120 is going to start SUPL location measurement.

In this case, the roaming location service start message, e.g., the RLP SSRLIR message, includes information about a geographic area previously designated by the SUPL agent 110.

The roaming location service start message, e.g., the RLP SSRLIR message, includes an indication parameter for requesting information according to a location measurement method intended by the H-SLP 220. The indication parameter may include one or more of a GEOGRAPHIC_AREA parameter for requesting information about the geographic area, an AREA-ID parameter for requesting IDs of cells with respect to the previously designated geographic area, and an AREA_ID_AND_GEOGRAPHIC_AREA parameter for requesting both the information about the geographic area and the IDs of the cells with respect to the geographic area.

Figure 6:
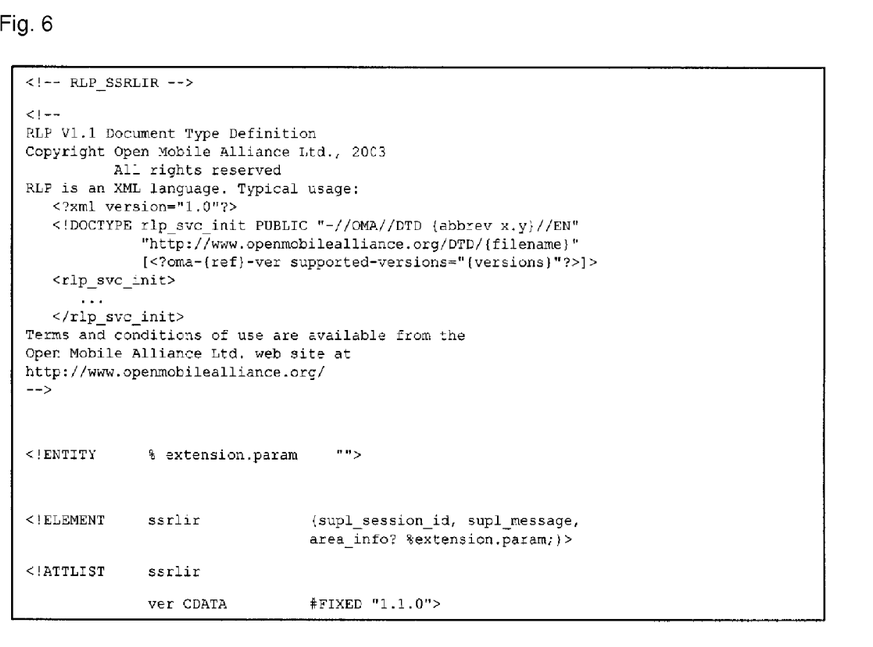
FIG. 6 illustrates an RLP SSRLIR message including a parameter according to a first embodiment of the present invention.
Figure 7:
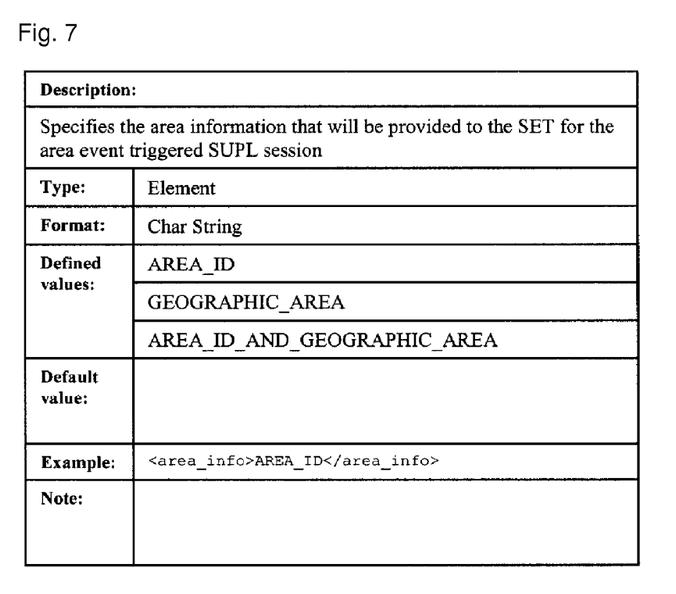
FIG. 7 illustrates in detail the parameter of FIG. 6.
Figure 8:
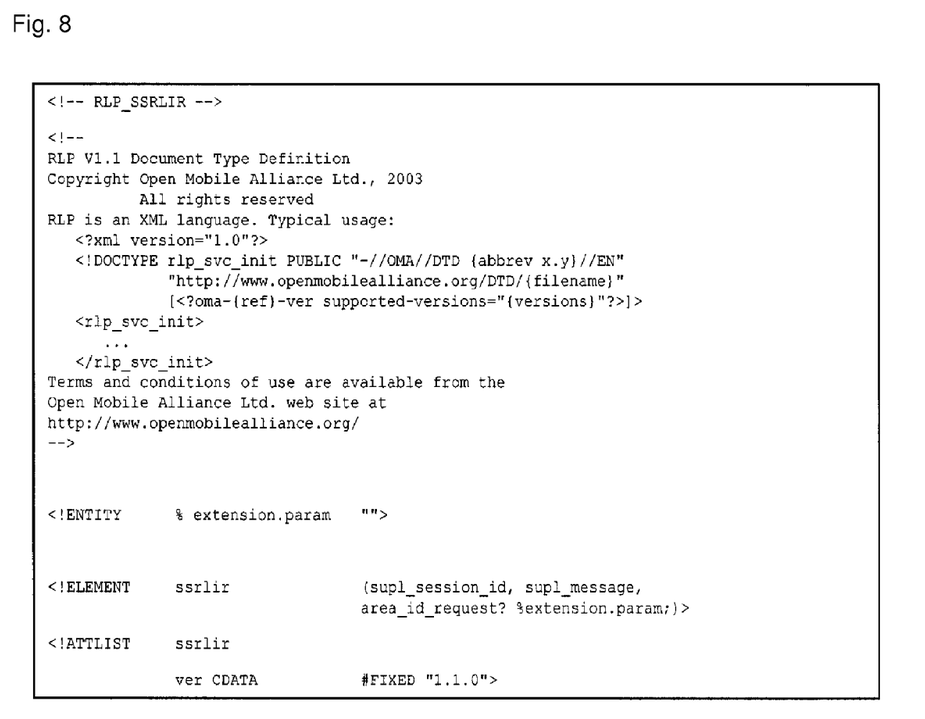
FIG. 8 illustrates an RLP SSRLIR message including a parameter according to a second embodiment of the present invention.
Figure 9:
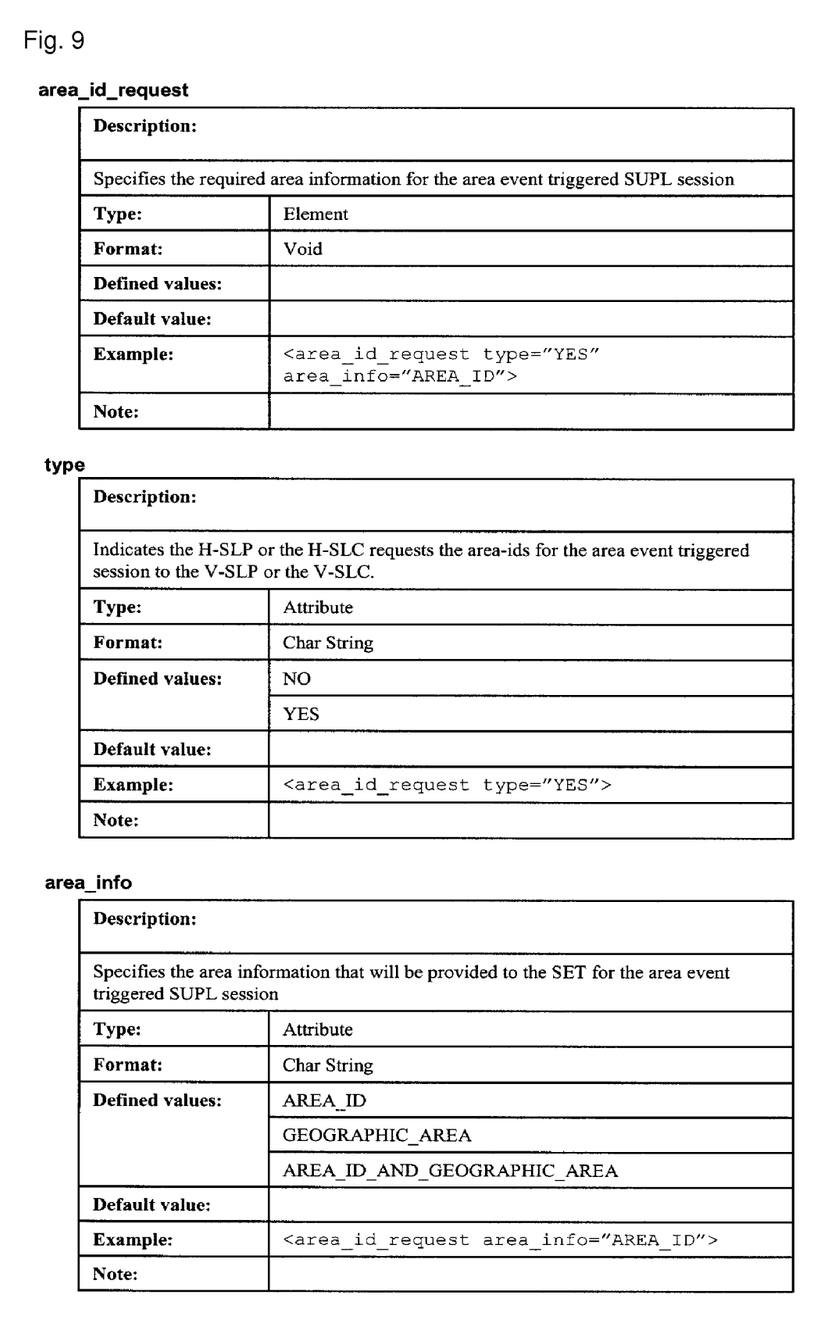
FIG. 9 illustrates in detail the parameter of FIG. 8.
Figure 10:
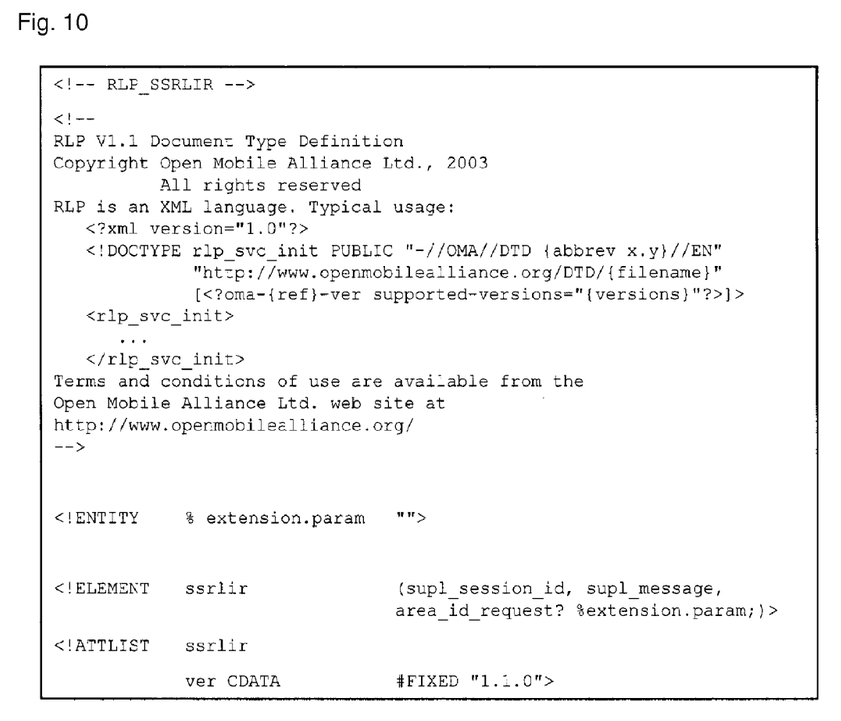
FIG. 10 illustrates an RLP SSRLIR message including a parameter according to a third embodiment of the present invention.
Figure 11:
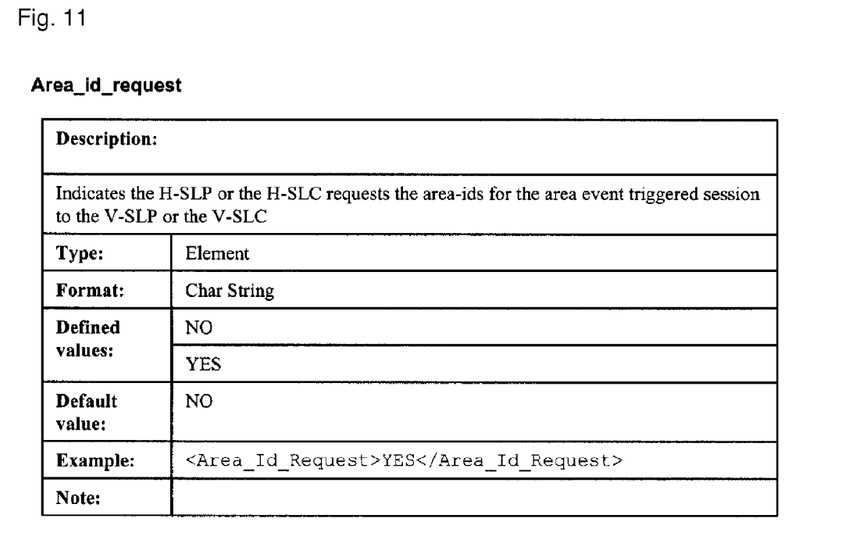
FIG. 11 illustrates in detail the parameter of FIG. 10.

The indication parameter may be, for example, an area_info parameter as shown in FIGS. 6 and 7, an area_id_request parameter as shown in FIGS. 8 and 9, or an area_id_request parameter as shown in FIGS. 10 and 11. The indication parameter will be described later with reference to FIGS. 6 to 11.

G) The V-SLP 210 determines an intended location measurement method to be used for the area event triggered session, includes a start response messages, i.e., a SUPL TRIGGERED RESPONSE message, in a roaming location service response message, e.g., an RLP SSRLIR (RLP Standard SUPL Roaming Location Immediate Answer) message, and transmits the same to the H-SLP 220.

In this case, the V-SLP 210 selects one of information about the geographic area and the ID information of the cells with respect to the previously designated geographic area according to the indication parameter, and includes the selected one in the start response message. Or, the V-SLP 210 includes both the information about the geographic area and the ID information of the cells in the start response message according to the indication parameter.

The start response message may further include a session-id parameter and a posmethod parameter.

H) The H-SLP 220 forwards the received start response message to the target SET 120.

I) Subsequently, the H-SLP 220 transmits a response message, e.g., an MLP (Mobile Location Protocol) TLRA (Triggered Location Reporting Answer) message, in response to the location service request message from the SUPL agent 110. The response message, i.e., the MLP TLRA message, includes a req_id parameter indicating an ID of the request.

Through such process, the request of the area triggered location service with respect to the target SET 120 is made.

The indication parameters will now be described with reference to FIGS. 6 to 11.

FIG. 6 illustrates a roaming location service start message, e.g., an RLP SSRLIR message, including an indication parameter according to a first embodiment of the present invention, and FIG. 7 illustrates in detail the indication parameter of FIG. 6.

As shown in FIG. 6, in the first embodiment of the present invention, the indication parameter, e.g., the area_info as shown in FIG. 6, designating the location measurement method intended by the H-SLP 220 is included in the roaming location service start message, e.g., the RLP SSRLIR message.

Then, the V-SLP 210 receives the roaming location service start message, e.g., the RLP SSLIR message, checks the indication parameter, e.g., the area_info parameter, and includes the information about the location measurement method intended by the H-SLP 220 in the start response message, e.g., the SUPL TRIGGERED RESPONSE message. And then, the V-SLP 210 includes the start response message in a roaming location service start response message, e.g., a SUPL SSRLIA message, and transmits the same to the H-SLP 220.

Then, the H-SLP 220 transfers the start response message in the SUPL SSRLIA message to the target SET 120. In this case, if the H-SLP 220 measures the location of the target SET 120, the H-SLP 230 may add several parameters and transmits the same.

The indication parameter, e.g., the area_info parameter, will now be described in more detail with reference to FIG. 7. The area_info parameter includes one of an AREA_ID parameter, a GEOGRAPHIC_AREA parameter, and an AREA_ID_AND_GEOGRAPHIC_AREA parameter.

The AREA_ID parameter is a parameter for requesting an area_id, the GEOGRAPHIC_AREA parameter is a parameter for requesting information about the geographic area, and the AREA_ID_AND_GEOGRAPHIC_AREA parameter is a parameter for requesting both the area_id and the information about the geographic area.

As described above, because the H-SLP 220 can selectively received information according to the location measurement method intended by the H-SLP 220 itself, a waste of network resources can be reduced.

FIG. 8 illustrates a roaming location service start message, e.g., an RLP SSRLIR message, including a parameter according to a second embodiment of the present invention, and FIG. 9 illustrates in detail the parameter of FIG. 8.

As shown in FIG. 8, in the second embodiment of the present invention, the area_id_request parameter is included in the roaming location service start message, e.g., the RLP SSRLIR message. For the RLP SSRLIR message, content as described above will be quoted.

The indication parameter, e.g., the area_id_request parameter, will now be described in more detail with reference to FIG. 9. The area_id_request parameter includes area_id_request type, area_info, as an attribute value. The area_id_request type indicates the presence or absence of a type file, and the area_info indicates a value of the area_info parameter. The area_id_request parameter includes a Type parameter and an area_info parameter at its lower portion. The Type parameter includes a Defined value, and the Defined value has a 'NO' value and 'YES' value.

The area_info parameter includes a Defined value, and the Defined value includes one of AREA_ID, GEOGRAPHIC_AREA, and AREA_ID_ANDGEOGRAPHIC_AREA.

FIG. 10 illustrates a roaming location service start message, e.g., an RLP SSRLIR message, including a parameter according to a third embodiment of the present invention, and FIG. 11 illustrates in detail the parameter of FIG. 10.

As shown in FIG. 10, in the third embodiment of the present invention, the area_id_request parameter is included in the roaming location service start message, e.g., the RLP SSRLIR message. For the RLP SSRLIR message, content as described above will be quoted.

The indication parameter, e.g., the area_id_request parameter, will now be described in more detail with reference to FIG. 11. The area_id_request parameter is used to request the Area_id parameter, namely, the ID of the cells with respect to the previously designated geographic area from the V-SLP 120.

When the received RLP SSRLIR message includes the area_id_request parameter, the V-SLP 120 includes the Area-id parameter in a start response message.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for providing a roaming location service for a terminal by a device, the method comprising:
    receiving, from the terminal by the device, a start message for starting the roaming location service while a session for a non-roaming location service for the terminal is ongoing;
    transmitting, from the device to a server of a network the terminal is visiting, a roaming location service start message, the roaming location service start message including an indication parameter for requesting information used to identify a location measurement method to be used by the server for the roaming location service and the start message received from the terminal;
    receiving, by the device from the server of the network the terminal is visiting, a roaming location service start response message including a start response message and the requested information used to identify the location measurement method to be used by the server for the roaming location service; and
    transferring, by the device to the terminal, the start response message and the requested information used to identify the location measurement method used by the server for the roaming location service,
    wherein the indication parameter indicates whether:
    only geographical area information is required of the roaming location service by the device,
    only an area ID is required of the server of the roaming location service by the device, or
    both the geographical area information and the area ID are required of the roaming location service by the device.

2. The method of claim 1, wherein the indication parameter is an area_info parameter or an area_id_request parameter.

3. The method of claim 2, wherein the area_info parameter includes one or more of an AREA_ID parameter, a GEOGRAPHIC_AREA parameter, and an AREA_ID_AND_GEOGRAPHIC_AREA parameter.

4. The method of claim 1, wherein the indication parameter is an area_id_request parameter that includes one or more of a type parameter and an area_info parameter.

5. The method of claim 1, wherein the start message is a secure user plane location (SUPL) TRIGGERED START message, and the start response message is a SUPL TRIGGERED RESPONSE message.

6. The method of claim 1, wherein the roaming location service start message is a roaming location protocol standard SUPL (secure user plane location) roaming location immediate request (RLP SSRLIR) message, and the roaming location service start response message is an RLP standard SUPL roaming location immediate answer (SSRLIA) message.

7. The method of claim 1, wherein the method is performed by a home secure user plane location (SUPL) location platform (H-SLP) server, and the server is a visiting SUPL location platform (V-SLP) server.

8. A device configured to provide a roaming location service for a terminal, the device comprising:
a processor configured to
receive, from the terminal, a start message for starting the roaming location service while a session for a non-roaming location service for the terminal is ongoing,
transmit, to a server of a network the terminal is visiting, a roaming location service start message, the roaming location service start message including an indication parameter for requesting information used to identify a location measurement method to be used by the server for the roaming location service and the start message received from the terminal,
receive, from the server of the network the terminal is visiting, a roaming location service start response message including a start response message and the requested information used to identify the location measurement method to be used by the server for the roaming location service, and
transfer, to the terminal, the start response message and the requested information used to identify the location measurement method used by the server for the roaming location service,
wherein the indication parameter indicates whether:
only geographical area information is required of the server of the network the terminal is visiting by the device,
only an area ID is required of the server of the network the terminal is visiting by the device, or
both the geographical area information and the area ID are required of the server of the network the terminal is visiting by the device.

9. The device of claim 8, wherein the indication parameter is an area_info parameter or an area_id_request parameter.

10. The device of claim 8, wherein the area_info parameter includes one or more of an AREA_ID parameter, a GEOGRAPHIC_AREA parameter, and an AREA_ID_AND_GEOGRAPHIC_AREA parameter.

11. The device of claim 8, wherein the indication parameter is an area_id_request parameter that includes one or more of a type parameter and an area_info parameter.

12. The device of claim 8, wherein the start message is a secure user plane location (SUPL) TRIGGERED START message, and the start response message is a SUPL TRIGGERED RESPONSE message.

13. The device of claim 8, wherein the roaming location service start message is a roaming location protocol standard SUPL (secure user plane location) roaming location immediate request (RLP SSRLIR) message, and the roaming location service start response message is an RLP standard SUPL roaming location immediate answer (SSRLIA) message.

14. The device of claim 8, wherein the device is a home secure user plane location (SUPL) location platform (H-SLP) server, and the server is a visiting SUPL location platform (V-SLP) server.

* * * * *